United States Patent
Dickman

(10) Patent No.: US 9,971,037 B2
(45) Date of Patent: May 15, 2018

(54) ANOMALY DETECTION USING AN ANTENNA BASELINE CONSTRAINT

(71) Applicant: Jeffrey Dickman, Thousand Oaks, CA (US)

(72) Inventor: Jeffrey Dickman, Thousand Oaks, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 891 days.

(21) Appl. No.: 14/066,317

(22) Filed: Oct. 29, 2013

(65) Prior Publication Data

US 2015/0116146 A1  Apr. 30, 2015

(51) Int. Cl.
*G01S 19/23* (2010.01)
*G01S 19/43* (2010.01)

(52) U.S. Cl.
CPC .............. *G01S 19/23* (2013.01); *G01S 19/43* (2013.01)

(58) Field of Classification Search
CPC .................................. G01S 19/23; G01S 19/43
USPC ..................................................... 342/357.51
See application file for complete search history.

(56) References Cited

U.S. PATENT DOCUMENTS

| | | | | |
|---|---|---|---|---|
| 5,825,326 A | * | 10/1998 | Semler ................... | G01S 19/44 342/352 |
| 6,211,821 B1 | | 4/2001 | Ford | |
| 6,336,061 B1 | | 1/2002 | Deines et al. | |
| 6,424,914 B1 | * | 7/2002 | Lin ....................... | G01C 21/165 342/357.29 |
| 6,792,380 B2 | | 9/2004 | Toda | |
| 6,861,979 B1 | * | 3/2005 | Zhodzishsky ........... | G01S 19/23 342/357.29 |
| 2005/0078739 A1 | * | 4/2005 | Korpet ................. | H04B 7/0848 375/148 |
| 2008/0072444 A1 | * | 3/2008 | Harrill ................. | G01B 11/002 33/600 |
| 2011/0090113 A1 | * | 4/2011 | Fenton .................... | G01S 19/54 342/357.36 |

(Continued)

FOREIGN PATENT DOCUMENTS

| | | | |
|---|---|---|---|
| GB | 2438218 A | * | 11/2007 |
| JP | 2008014938 A | | 1/2008 |

(Continued)

OTHER PUBLICATIONS

PCT International Preliminary Report on Patentability, PCT/US2014/061382, dated May 3, 2016.*

(Continued)

*Primary Examiner* — Frank J McGue
(74) *Attorney, Agent, or Firm* — Tarolli, Sundheim, Covell & Tummino LLP

(57) ABSTRACT

Systems and methods are provided for monitoring carrier phase anomalies in a range finding system. A relative carrier phase between first and second antennas is predicted as a function of a relative position between the two antennas. A relative carrier phase between the first and second receivers is measured based upon at least one transmitted signal received at each of the first and second antennas. An anomaly detection metric is calculated as a difference between the measured relative carrier phase and the predicted relative carrier phase. It is then determined if an anomaly is present according to the anomaly detection metric.

20 Claims, 3 Drawing Sheets

(56) References Cited

U.S. PATENT DOCUMENTS

2011/0115669 A1\* 5/2011 Milyutin ................. G01S 19/20
342/357.27
2012/0081248 A1\* 4/2012 Kennedy ............... G01S 5/0242
342/118

FOREIGN PATENT DOCUMENTS

| JP | 2009274588 A | 11/2009 |
|----|--------------|---------|
| JP | 2009294009 A | 12/2009 |
| JP | 2010523395 A | 7/2010 |
| JP | 2010539812 A | 12/2010 |
| JP | 2013507611 A | 3/2013 |
| WO | 2011044672 A1 | 4/2011 |

OTHER PUBLICATIONS

Office Action for corresponding JP 2016-527334, dated Apr. 14, 2017.

\* cited by examiner

ANOMALY DETECTION USING AN ANTENNA BASELINE CONSTRAINT

FIELD OF THE INVENTION

The invention relates generally to range finding systems, which can include Global Navigation Satellite Systems (GNSS) Receivers. More specifically, the invention relates to anomaly detection in a multiple antenna system that utilizes a known or measured baseline between antennas.

BACKGROUND OF THE INVENTION

In range finding applications, a receiver can utilize information extracted from messages received from one or more transmitters to determine the transit time of each message. A distance to each transmitter can be determined from the transit time given the known propagation speed of electromagnetic radiation, and a position of the receiver, at least relative to the transmitters, can be determined via multilateration. A well-known example of a range finding application is the Global Positioning System.

SUMMARY OF THE INVENTION

In accordance with an aspect of the present invention, a method is provided for monitoring carrier phase anomalies in a range finding system. A relative carrier phase between first and second antennas is predicted as a function of a relative position between the two antennas. A relative carrier phase between the first and second receivers is measured based upon at least one transmitted signal received at each of the first and second antennas. An anomaly detection metric is calculated as a difference between the measured relative carrier phase and the predicted relative carrier phase. It is then determined if an anomaly is present according to the anomaly detection metric.

In accordance with another aspect of the present invention, a system includes a first antenna configured to receive a signal from a transmitter and a second antenna configured to receive the signal from the transmitter, with the second antenna being separated from the first antenna by a baseline. A signal processor is configured to calculate a measured relative carrier phase between the first antenna and the second antenna according to the received signal. A relative carrier phase estimator is configured to estimate a predicted relative carrier phase between the first antenna and the second antenna according to the baseline between the first antenna and the second antenna. An anomaly detection component is configured to determine if an anomaly is present according to an anomaly detection metric. The anomaly detection metric is determined as a function of a difference between the measured relative carrier phase and the predicted relative carrier phase.

In accordance with still another aspect of the present invention, a global navigation satellite system includes a first receiver configured to receive signals from a plurality of GNSS satellites and a second receiver configured to receive signals from the plurality of GNSS satellites, with respective antennas of the first and second receivers being separated by a known baseline. A signal processor is configured to calculate a double differenced carrier phase between the first receiver and the second receiver according to the received GNSS satellite signals. A relative carrier phase estimator is configured to estimate a predicted relative carrier phase between the first receiver and the second receiver according to the baseline between the first antenna and the second antenna. An anomaly detection component is configured to determine that an anomaly is present if a difference between the measured relative carrier phase and the predicted relative carrier phase exceeds a predetermined threshold value.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

In accordance with an aspect of the present invention, systems and methods are provided for anomaly detection in range finding systems. The system deals with detection of measurement anomalies by using knowledge of the relative distance between the receivers to predict some aspects of the expected measurements. The systems and methods described herein identify measurement anomalies by applying a known baseline constraint to the incoming carrier phase measurements between two antennas to predict the measurements and detect deviation from the predicted measurements. The incoming relative carrier phase measurements are predicted using precise knowledge of the position difference between these two antennas, either in space or in time. This measurement prediction provides a reference for detecting carrier phase anomalies affecting either of the receivers in the baseline. This technique is not dependent on statistically resolving carrier cycle counts since they are directly computed at each time epoch. Precise knowledge of the baseline can either come from a priori knowledge of a rigid baseline (e.g., antenna self-calibration survey) or from a secondary measurement of the flexible antenna baseline (e.g., laser ranging).

Carrier phase measurements are very precise due to a receiver's ability to track the carrier within a small fraction of its wavelength. Carrier phase measurements are used in many different domains including global navigation satellite systems (GNSS) such as the Global Positioning System (GPS) interferometry and Very Long Baseline Interferometry (VLBI) radar processing. The measurement consumer in each domain desires an assessment of the measurement accuracy and reliability. Systems and methods in accordance with an aspect of the present invention provide an algorithm for receiver-level anomaly detection in any domain that uses carrier phase interferometry by comparing the received measurements with synthetic measurement predictions. In addition, this technique can be used to provide geometrically constrained corrections for post-correlation digital beam forming by predicting the differential carrier phase measurements produced by a controlled reception pattern antenna (CRPA) in conjunction with the inertial attitude and heading measurements.

Figure 1:
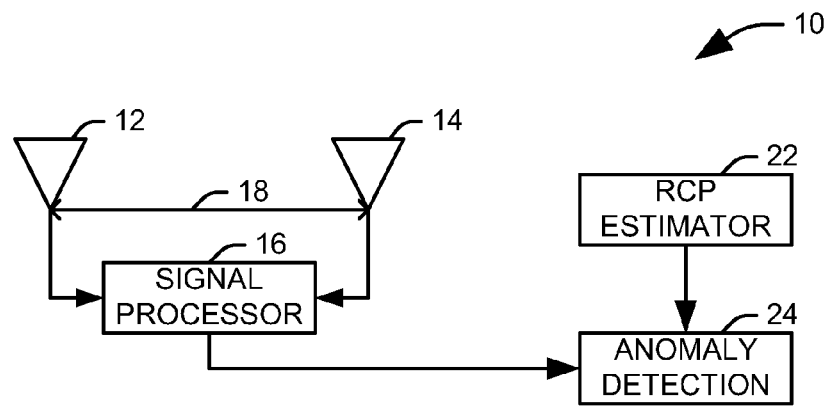
FIG. 1 illustrates one example of a range finding system utilizing anomaly detection in accordance with an aspect of the present invention.

FIG. 1 illustrates one example of a range finding system 10 utilizing anomaly detection in accordance with an aspect of the present invention. The range finding system 10 includes at least two antenna locations 12 and 14 associated with at least one antenna configured to receive signals from one or more transmitters. In general, the system will have multiple antennas, but it will be appreciated that the antenna locations 12 and 14 can represent multiple measurements at a single antenna made at two different times on a moving platform. Where multiple antennas are present, each antenna will generally be associated with a specific receiver platform, but it will be appreciated that in some applications, a single platform may have multiple, and even redundant, antennas to allow for integrity monitoring of the signals received at the antennas. Each of these signals will generally contain a structured or pseudo-random code that can be used for determining a time-of-flight for the signal. The received signals are processed at an associated signal processor 16 that calculates a measured relative carrier phase between a given pair of the at least two antenna locations 12 and 14. In one implementation, the measured relative carrier phase is determined as a double differenced relative carrier phase.

In accordance with an aspect of the present invention, the given pair of the at least two antenna locations 12 and 14 can be separated by a known baseline 18. In one implementation, the baseline 18 is fixed, such that a measurement prior to operation of the system can be used. The carrier phase ambiguity can be resolved using the fixed baseline constraint. For example, the baseline length can be surveyed in a body frame associated with the system 10 using external sensors and then transformed from body coordinate frame to navigation coordinates. If the platform for the system is nominally a two-dimensional platform such as a car or train, only a heading is required from an external sensor, such as a magnetometer, for this transformation. For a three-dimensional platform such as a boat or aircraft, a leveled inertial measurement can be added to estimate the roll and pitch of the platform to allow for the shift in the orientation of the baseline relative to the navigation frame of reference to be tracked. As long as the external sensors provide an accurate enough orientation to predict the rotated baseline within one-half of a wavelength of the range finding system 10, the ambiguity can be deterministically resolved in a single epoch.

It will be appreciated that the baseline 18 can be flexible, that is, variable, and in these implementations, the baseline is monitored on a periodic or continuous basis by an external measurement device (not shown). For example, the two antenna locations 12 and 14 can be on different mobile platforms or located on a portion of a single platform that flexes with movement, such that their relative positions are not fixed. In one implementation, laser ranging can be used to monitor the flexible baseline. A relative carrier phase (RCP) estimator 22 is configured to calculate a predicted relative carrier phase from the known baseline. In one implementation, the predictive relative carrier phase is calculated as a function of the known baseline and a representation of a line of sight between the one or more transmitters and at least one of a first antenna location of the given pair 12, a second antenna location of the pair 14, and a point located on the baseline 18 between the two antenna locations.

Each of the measured carrier phase and the predicted relative carrier phase are provided to an anomaly detection component 24. The anomaly detection component 24 determines if a measurement anomaly is present according to an anomaly detection metric determined as a function of a difference between the predicted relative carrier phase and the measured relative carrier phase. For example, the anomaly detection component 24 can provide the calculated anomaly detection metric to as a feature to an expert system, for example, a regression model, an artificial neural network classifier, or a rule-based expert system, to determine if an anomaly is present. It will be appreciated that multiple anomaly detection metrics can be accumulated over a predetermined period of time, such that an expert system can utilize a time series of metrics as classification features. In one implementation, the anomaly detection component 24 compares the difference between the measured relative carrier phase and the predicted relative carrier phase to a threshold value determine if a measurement anomaly is present. For example, the threshold can be equal to a quarter of a characteristic wavelength associated with a carrier of the received signals. If the difference exceeds the threshold, an anomaly flag can be triggered to indicate that a measurement anomaly is present. For example, a measurement anomaly can indicate a tracking error associated with one of the antennas or the presence of fake signals as might be caused by spoofing or meaconing.

Figure 2:
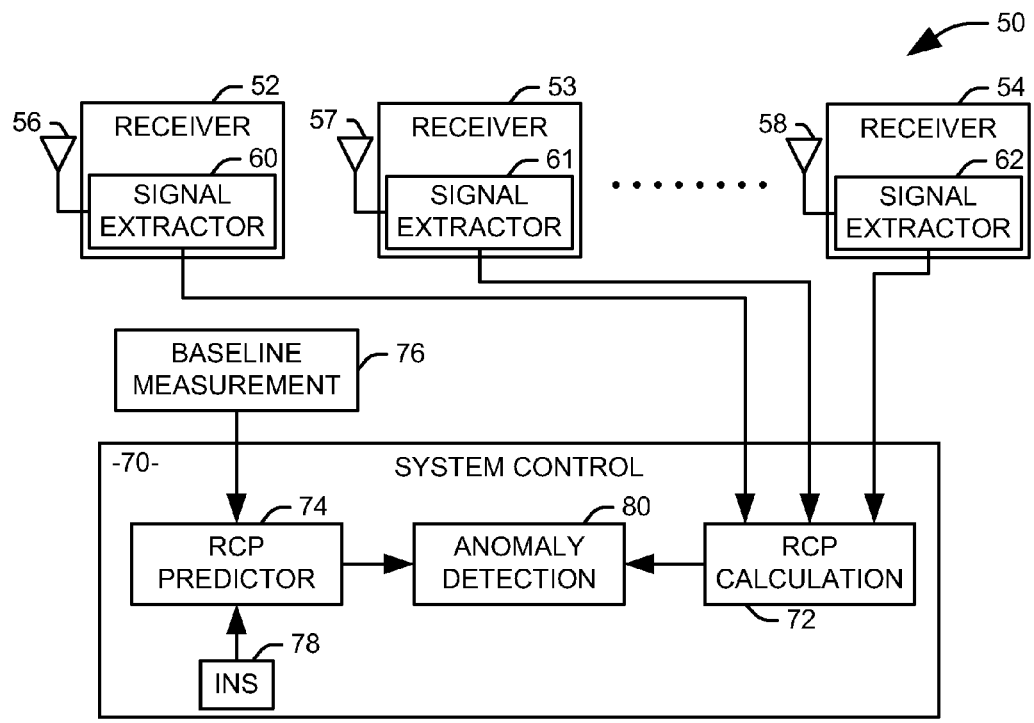
FIG. 2 illustrates one implementation of a global navigation satellite system utilizing anomaly detection in accordance with an aspect of the present invention.

FIG. 2 illustrates one implementation of a global navigation satellite system (GNSS) 50 utilizing anomaly detection in accordance with an aspect of the present invention. In the illustrated implementation, a plurality of receivers 52-54 detect a navigation signal provided by one or more GNSS satellites. At each receiver 52-54, the incoming satellite signals are received by one or more elements on a multi-element GPS antenna 56-58 and converted into usable signals. For example, the receivers 52-54 can include a multi-channel RF front-end that downconverts the received signal to baseband. The downconverted signals are then digitized and provided to a plurality of signal extractors 60-62. In the illustrated implementation, the signal extractors 60-62 can include correlators configured to search the Doppler and delay correlation space for the strongest correlation energy indicating the presence of an incoming signal. The correlators can be setup to provide localized correlation values at points surrounding the acquired signals which then allows signal tracking. Once the signal is located by the correlators, range finding information is extracted from the signal, making it possible to determine a time of transit of the signal, and thus a psuedorange to the transmitter from each receiver 52-54.

The extracted range finding information can include a code pseudorange, which is the "distance" between the transmitter at some transmit time and the receiver at some receive time. Because the transmit time and the receive time are different, it is impossible to measure the true range between the satellite and the receiver. A phase psuedorange is based on the carrier phase of the signal and does not require the actual information being transmitted. In the illustrated implementation, the carrier phase is used instead of the code or phase psuedorange. To determine the carrier phase (i.e., accumulated Doppler range), a fractional beat phase of the received signal with a signal from a local oscillator having known properties can be measured and converted into the range domain by scaling the measured beat with the wavelength.

A system control 70 includes a relative carrier phase (RCP) calculation component 72 that determines a relative phase between the two receivers from the determined phase measurements. It will be appreciated that the system control 70 can be located at one of the receivers (e.g., 52), distributed among the plurality of receivers 52-54, or located remotely. The illustrated system 50 uses differenced phase processing to determine the relative phase. Differenced phase processing generally uses measurements from two or more receivers at arbitrary positions to cancel common errors via carrier phase interferometry techniques. The illustrated system 50 uses double differenced processing to form the interferometric observations. In double difference processing, single differences are formed by determining differences between observations from two separate receivers to a single satellite. Taking the difference between two single differences for a specific receiver pair gives the carrier phase double difference, which can be used to determine the relative carrier phase between the pair of receivers.

The system control 70 can further include a relative carrier phase predictor 74 that calculates a predicted relative carrier phase between two receivers according to a known baseline between the receivers. In one implementation, the predicted relative carrier phase is calculated as a product of a line of sight matrix, representing a line of sight between the transmitters and at least one point on the baseline, and a position vector representing the known baseline (e.g., a relative position of the two receivers). It will be appreciated that the line of sight matrix generally represents a direction of one or more transmitters from one or both of the receivers in the pair defining the baseline. It will be appreciated that the baseline between two receivers can be rigid and measured during a configuration of the system to provide the known baseline. In the illustrated implementation, however, a flexible (i.e., variable) baseline is assumed, and the system control 70 can be operatively connected to a baseline measurement component 76 configured to dynamically measure the baseline. For example, the baseline measurement component 76 can include a laser rangefinder configured to measure the distance between the two receivers, specifically, between the antennas associated with the receivers.

A calibration can be performed to determine the baseline vector and its orientation in space within a body-referenced coordinate frame used by an inertial navigation system (INS) 78. The INS can be used to continuously provide the dynamic relationship between the body and navigation frames and thus the ability to predict the relative carrier phase measurements. The coordinate frame transform can be accomplished using two direction cosines matrices. A first matrix provides a static calibration which relates a survey frame to the body frame, while the second matrix provides an on-the-fly conversion which relates the static body coordinate frame to the dynamic navigation frame, for example, using the relationship determined at the INS 78. Accordingly, a known or measured baseline in the body frame can be represented in the navigation frame to allow for prediction of the relative carrier phase.

It will be appreciated that the measured carrier phase can have a degree of ambiguity, for example, in the integer number of wavelengths between two phase measurements. This carrier phase ambiguity can be resolved using a known rigid baseline constraint. This involves surveying the baseline length in the body frame and then transforming it from body to navigation coordinates using external sensors. If the platform is nominally a two-dimensional platform such as a car or a train, only a heading is required from an external sensor such as a magnetometer. For a three-dimensional platform, such as a boat or an aircraft, a leveled IMU can be added to estimate the roll and pitch of the platform. As long as the external sensors provide accurate enough orientation to predict the rotated baseline within one-half of a wavelength, the ambiguity can be deterministically resolved in a single epoch.

Consider, for example. a 2D rigid baseline of length one meter and a magnetometer with an accuracy of ±1 degree. For this case, the magnetometer can be used to predict the baseline in navigation coordinates with an accuracy of 17.46 mm. A longer baseline amplifies the position prediction error for a given magnetometer error. For a two meter baseline and the same magnetometer, the position prediction accuracy would be 34.91 mm. Both cases are within half of the 19 cm L1 GPS wavelength.

Accordingly, a raw widelane quantity, $WL_{raw}$, can be computed as:

$$WL_{raw} = \left[\frac{(SD_{L1} - SD_{L1key})}{\lambda_{L1}} - \frac{(SD_{L2} - SD_{L2key})}{\lambda_{L2}}\right] \cdot \lambda_{WL} \quad \text{Eq. 1}$$
$$= \left[\frac{DD_{L1,raw}}{\lambda_{L1}} - \frac{DD_{L2,raw}}{\lambda_{L2}}\right] \cdot \lambda_{WL}$$

where $SD_{L1}$ is a single differenced phase measurement on the L1 carrier, where $SD_{L2}$ is a single differenced phase measurement on the L2 carrier, where $DD_{L1,\,raw}$ is a raw double differenced phase measurement on the L1 carrier, where $DD_{L2,\,raw}$ is a raw double differenced phase measurement on the L2 carrier, $\lambda_{L1}$ is a wavelength of the L1 carrier, $\lambda_{L2}$ is a wavelength of the L2 carrier, and $\lambda_{WL}$ is the wide lane wavelength The body-frame baseline and heading, $DD_{est}$, can be parameterized as:

$$\begin{aligned}DD_{est} &= H \cdot b^n \quad \text{Eq. 2}\\ &= H \cdot C_b^n \cdot b^b \\ &= H \begin{bmatrix} \cos\psi & \sin\psi & 0 \\ -\sin\psi & \cos\psi & 0 \\ 0 & 0 & 1 \end{bmatrix} \cdot b^b \\ &= H \begin{bmatrix} b_x^b \cos\psi + b_y^b \sin\psi \\ -b_x^b \sin\psi + b_y^b \cos\psi \\ b_z^b \end{bmatrix} \end{aligned}$$

where $b^n$ is the baseline in a navigational frame, H is the heading, $b^b$ is the baseline in a body frame, and $C_b^n$ is a rotation matrix representing the alignment of the body in the navigation frame.

The narrowlane ambiguity, $N_{WL}$, can be determined as a difference between the raw widelane ambiguity and the body frame baseline and heading, such that $N_{WL}=\text{round}(WL_{raw}-DD_{est})$. A final widelane quantity, WL, can be computed as $WL_{raw}-N_{WL}*\lambda_{WL}$. A handover, HO, can be computed as a moving average filter, such that $HO=\text{wavg}(DD_{L1,raw}-WL)$, with an L1 ambiguity, $N_{L1}$, computed as $N_{L1}=\text{round}(HO/\lambda_{L1})$. An L2 ambiguity is determined as a difference between the L1 ambiguity and the narrowlane ambiguity. From these values, single frequency measurement, $DD_{L1}$ and $DD_{L2}$, can be determined as:

$$DD_{L1}=DD_{L1,raw}-N_{L1}\cdot\lambda_{L1} \text{ and } DD_{L2}=DD_{L2,raw}-N_{L2}\cdot\lambda_{L2}$$

Once a carrier phase between at least two receivers has been measured and a predicted relative carrier phase has been calculated, both values are provided to an anomaly detection component 80. The anomaly detection component 80 determines if a measurement anomaly is present from a difference between the predicted relative carrier phase and the measured relative carrier phase. In the illustrated implementation, the anomaly detection component 80 compares a difference between the measured relative carrier phase and the predicted relative carrier phase to a threshold value determine if a measurement anomaly is present. For example, the threshold can be equal to a quarter of a characteristic wavelength associated with a carrier of the received signals. If the difference exceeds the threshold, an anomaly flag can be triggered to indicate that a measurement anomaly is present. For example, a measurement anomaly can indicate a tracking error associated with one of the antennas or the presence of fake signals as might be caused by spoofing or meaconing.

Figure 3:
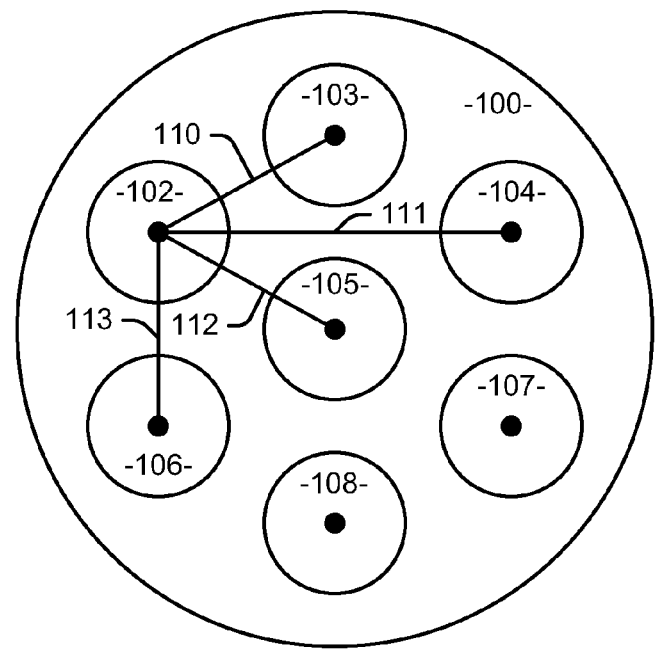
FIG. 3 illustrates a controlled reception pattern antenna configured to utilize an anomaly detection system in accordance with an aspect of the present invention.

Many interferometry systems have spatially or temporally separated antennas (or elements) which could employ the techniques for anomaly detection described herein. For example, many anti-jam navigation systems use a controlled reception pattern antenna or enhanced jamming protection. FIG. 3 illustrates a controlled reception pattern antenna 100 that could utilize an anomaly detection system in accordance with an aspect of the present invention. The controlled reception pattern antenna 100 comprises a plurality of antenna nodes 102-108 maintained at constant relative positions. Accordingly, respective baselines 110-113 between a first antenna node 102 and neighboring antenna nodes 103-106 are rigid, and can be measured, for example, during an antenna self-calibration survey. In the illustrated implementation, these rigid baselines are measured in a body-referenced coordinate frame through a static survey and must be dynamically converted to a navigation coordinate frame to account for movement and rotation of the platform before they can be used for measurement prediction. Measurement anomalies can be detected for the CRPA when the phase measurements are processed individually from each antenna element, and the measurements do not match the predicted phase measurements.

Figure 4:
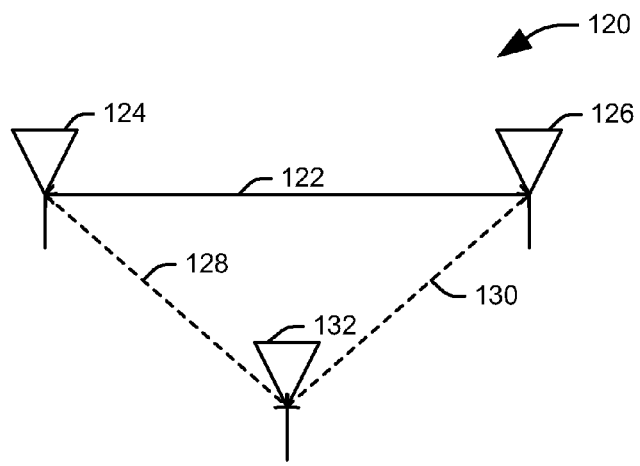
FIG. 4 illustrates a redundant antenna arrangement to facilitate the use of an anomaly monitoring system in accordance with an aspect of the present invention.

Another example antenna arrangement 120 is shown in FIG. 4, in which the anomaly monitoring system monitors a rigid baseline 122 between redundant antennas 124 and 126 to validate nodal measurements which are constituents of a flexible baseline (e.g., 128 or 130) between one of the redundant antennas (e.g., 124 or 126) and a third antenna 132. Essentially, the addition of a redundant antenna (e.g., 126) creates a rigid baseline 122 with one of the antennas 124 in a pair of antennas 124 and 132 needed for an application. This rigid baseline 122 allows for a more accurate prediction of the relative carrier phase, and accordingly, for more accurate anomaly monitoring. Since many sources of error would affect all local antennas, the more accurate anomaly monitoring over the rigid baseline 122 can be used to ensure the integrity of the entire array 120. Redundant antennas might be used, for example, on an airborne refueling platform to facilitate the use of an anomaly monitoring system as an input to an integrity monitor. A similar configuration could be used for very long baseline interferometry (VLBI) radars, in which the radar aperture is extended to include multiple antennas and the radar measurement is compared against a prediction drawn from redundant antennas.

While the example of FIG. 2 utilizes multiple antennas and multiple receivers, the same techniques can also be used temporally, with the antenna baseline formed at two or more discrete times from the same receiver. The temporal baseline can be constrained by an external observation of displacement (e.g., inertial measurement unit or odometer) and thereby provide a means to predict the expected carrier phase measurement and form a detection metric.

In the examples of FIGS. 2-4, the anomaly detector can detect measurement errors whose magnitude is a small fraction of the measurement wavelength as long as the anomaly is larger than the measurement noise. Anomalies include events at the receiver-level, such as tracking errors, or at the signal level, such as fake signals like spoofing or meaconing. This technique is not limited by the correctness of ambiguity resolution, or error sources such as correlated noise, multipath, or cycle slips. In fact, an anomaly detection system in accordance with an aspect of the present invention is sensitive enough to detect these error sources.

Figure 5:
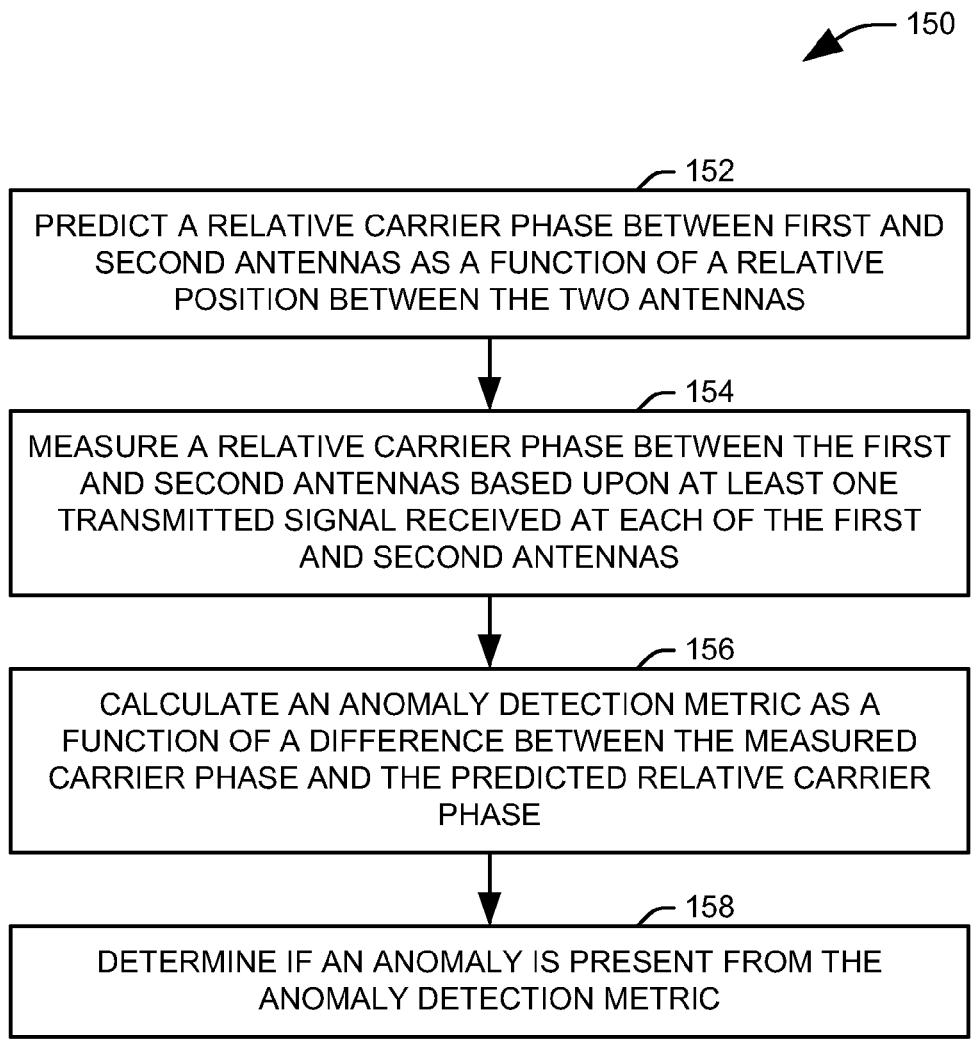
FIG. 5 illustrates a method for monitoring carrier phase anomalies in a range finding system in accordance with an aspect of the present invention.

In view of the foregoing structural and functional features described above, an example method will be better appreciated with reference to FIG. 5. While, for purposes of simplicity of explanation, the method of FIG. 5 is shown and described as executing serially, it is to be understood and appreciated that the present invention is not limited by the illustrated order, as some actions could, in other examples, occur in different orders from that shown and described herein or could occur concurrently.

FIG. 5 illustrates a method 150 for monitoring carrier phase anomalies in a range finding system in accordance with an aspect of the present invention. At 152, a relative carrier phase between first and second antennas is predicted as a function of a relative position between the two antennas. It will be appreciated that the relative position can be known from a calibration of the range finding system and simply stored as a parameter in a system control. Alternatively, the relative position between the two antennas can be periodically determined, for example, via laser range finding or another appropriate means for tracking the relative position of two objects. In general, the relative position between the two antennas is determined in a body-referenced coordinate frame associated with the range finding system and translated to a navigation coordinate frame via a coordinate transform. In one implementation, the relative carrier phase is predicted as a function of the relative position between the two antennas and a known position of a plurality of transmitters in the range finding system. For example, the predicted relative carrier phase can be calculated as a product of a line of sight matrix, representing the relative position of the plurality of transmitters and at least one point associated with a baseline between the two antennas, and a vector representing the relative position of the two antennas.

At 154, a relative carrier phase between the first and second antennas is measured based upon at least one transmitted signal received at each of the first and second antennas. In one implementation, a double differenced carrier phase can be calculated for the two antennas using signals from two transmitters having known locations relative to the antennas. At 156, an anomaly detection metric is determined as a function of a difference between the measured relative carrier phase and the predicted relative carrier phase. In one implementation, the anomaly detection metric is a linear function of the difference between the measured relative carrier phase and the predicted relative carrier phase, but it will be appreciated that, depending on the analysis means used to detect the anomaly, that non-linear functions of this difference may be useful.

At 158, it is determined if an anomaly is present according to the anomaly detection metric. In one implementation, an anomaly is determined to be present if the anomaly detection metric exceeds a predetermined threshold value, such as one-quarter of a wavelength associated with one of the at least one transmitted signal. In another implementation, a rule-based expert system is provided with a time series of calculated anomaly detection metrics to determine a likelihood that an anomaly is present. Once a measurement anomaly is detected, it can be flagged and reported to an operator to allow for appropriate adjustment to the range finding system.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

I claim:

1. A method for monitoring carrier phase anomalies in global navigation satellite system (GNSS) comprising first and second antennas implemented on a mobile platform comprising:
  receiving signals from a plurality of GNSS satellites at a first receiver operatively connected to the first antenna;
  receiving signals from the plurality of GNSS satellites at a second receiver operatively connected to the second antenna;
  measuring an orientation of the mobile platform at an inertial navigation system comprising at least one sensor;
  predicting a relative carrier phase between respective first and second antenna locations of the first and second antennas as a function of a relative position between the two antenna locations and the orientation of the mobile platform, as determined at the inertial navigation system;
  measuring a relative carrier phase between the first and second antenna locations based upon the received signals at the first receiver and the second receiver;
  calculating an anomaly detection metric as a function of a difference between the measured relative carrier phase and the predicted relative carrier phase; and
  providing a time series of calculated anomaly detection metrics to a rule-based expert system to determine if an anomaly is present.

2. The method of claim 1, wherein determining if an anomaly is present according to the anomaly detection metric comprises determining if the anomaly detection metric exceeds a predetermined threshold value.

3. The method of claim 2, wherein the predetermined threshold value is one-quarter of a wavelength associated with one of the at least one transmitted signal.

4. The method of claim 1, wherein predicting the relative carrier phase between first and second antenna locations comprises predicting the relative carrier phase as a function of the relative position between the two antenna locations and a known position of the plurality of GNSS satellites.

5. The method of claim 4, wherein the predicting the relative carrier phase between first and second antenna locations comprises computing a product of a line of sight matrix, representing the relative position of the plurality of GNSS satellites and at least one point associated with a baseline between the two antenna locations, and a vector representing the relative position of the two antenna locations.

6. The method of claim 1, further comprising periodically determining the relative position between the two antenna locations.

7. The method of claim 1, further comprising:
  determining the relative position between the two antenna locations in a body-referenced coordinate frame associated with the range finding system; and
  transforming the determined relative position to a navigation coordinate frame via a coordinate transform.

8. A global navigation satellite system (GNSS) comprising:
  a first antenna operatively connected to a first receiver configured to receive signals from a plurality of GNSS satellites;
  a second antenna operatively connected to a second receiver configured to receive the signals from the plurality of GNSS satellites, the second antenna being separated from the first antenna by a baseline;
  a laser rangefinder to dynamically measure the baseline between the first antenna and the second antenna;
  a signal processor configured to calculate a measured relative carrier phase between the first antenna and the second antenna according to the received signal;
  a relative carrier phase estimator configured to estimate a predicted relative carrier phase between the first antenna and the second antenna according to the baseline between the first antenna and the second antenna and known positions of the plurality of GNSS satellites, the relative carrier phase estimator computing a product of a line of sight matrix, representing the relative position of the plurality of GNSS satellites and at least one point associated with a baseline between the two antennas, and a vector representing the relative position of the two antennas; and
  an anomaly detection component configured to determine if an anomaly is present according to an anomaly detection metric, the anomaly detection metric being determined as a function of a difference between the measured relative carrier phase and the predicted relative carrier phase.

9. The system of claim 8, further comprising an inertial measurement unit configured to monitor rotation of a platform associated with at least one of the first antenna and the second antenna, the relative carrier phase estimator being further configured to translate the baseline between the first antenna and the second antenna from a coordinate frame associated with the platform to a navigation coordinate frame according to the monitored rotation.

10. The system of claim 8, further comprising a third antenna having a flexible baseline with each of the first antenna and the second antenna, the metric comparison component determining if an anomaly is present between the third antenna and one of the first antenna and the second antenna according to the anomaly detection metric.

11. The system of claim 10, wherein each of the first antenna, the second antenna, and the third antenna are implemented on an airborne refueling platform, an output of the anomaly detection component being provided to an integrity monitor associated with the airborne refueling platform.

12. The system of claim 8, wherein the first antenna and the second antenna are first and second nodes of a plurality of antenna nodes comprising a controlled reception pattern antenna array.

13. The system of claim 8, wherein the anomaly detection component comprises a rule-based expert system.

14. A global navigation satellite system (GNSS) implemented on a mobile platform comprising:
   a first receiver that receives signals from a plurality of GNSS satellites;
   a second receiver that receives signals from the plurality of GNSS satellites, respective antennas of the first and second receivers being separated by a known baseline;
   an inertial measurement system that determines an orientation of the known baseline from at least one sensor;
   a signal processor that calculates a double differenced carrier phase between the first receiver and the second receiver according to the received GNSS satellite signals;
   a relative carrier phase estimator that estimates a predicted relative carrier phase between the first receiver and the second receiver according to the known baseline between the first antenna and the second antenna and the determined orientation of the baseline; and
   an anomaly detection component that determines that an anomaly is present if a difference between the measured relative carrier phase and the predicted relative carrier phase exceeds a predetermined threshold value;
   wherein the plurality of GNSS satellites is a first GNSS constellation and the anomaly detection component is further configured to use observations from the first GNSS constellation to validate at least one observation from a second GNSS constellation.

15. The GNSS system of claim 14, wherein the predetermined threshold value is one-quarter of a wavelength associated with a GNSS carrier.

16. The GNSS system of claim 14, wherein the anomaly detection component comprises a rule-based expert system.

17. The GNSS system of claim 14, wherein the relative carrier phase estimator is configured to compute a product of a line of sight matrix, representing the relative position of the a plurality of GNSS satellites and at least one point associated with the known baseline between the antennas of the first receiver and the second receiver, and a vector representing the relative position of the antennas of the first receiver and the second receiver.

18. The GNSS system of claim 14, further comprising a rangefinder to periodically measure the baseline between the antennas of the first receiver and the second receiver.

19. A method for monitoring carrier phase anomalies in global navigation satellite system (GNSS) comprising first and second antennas implemented on a mobile platform comprising:
   receiving signals from a plurality of GNSS satellites at a first receiver operatively connected to the first antenna;
   receiving signals from the plurality of GNSS satellites at a second receiver operative connected to the second antenna;
   periodically determining a relative position between the two antenna locations;
   measuring an orientation of the mobile platform at an inertial navigation system comprising at least one sensor;
   predicting a relative carrier phase between respective first and second antenna locations of the first and second antennas as a function of the relative position between the two antenna locations and the orientation of the mobile platform, as determined at the inertial navigation system;
   measuring a relative carrier phase between the first and second antenna locations based upon the received signals at the first receiver and the second receiver;
   calculating an anomaly detection metric as a function of a difference between the measured relative carrier phase and the predicted relative carrier phase; and
   determining if an anomaly is present according to the anomaly detection metric.

20. A method for monitoring carrier phase anomalies in global navigation satellite system (GNSS) comprising first and second antennas implemented on a mobile platform comprising:
   receiving signals from a plurality of GNSS satellites at a first receiver operatively connected to the first antenna;
   receiving signals from the plurality of GNSS satellites at a second receiver operative connected to the second antenna;
   measuring an orientation of the mobile platform at an inertial navigation system comprising at least one sensor;
   predicting a relative carrier phase between respective first and second antenna locations of the first and second antennas as a function of a relative position between the two antenna locations, known positions of the plurality of GNSS satellites, and the orientation of the mobile platform, as determined at the inertial navigation system, wherein the predicting the relative carrier phase between first and second antenna locations comprises computing a product of a line of sight matrix, representing the relative position of the plurality of GNSS satellites and at least one point associated with a baseline between the two antenna locations, and a vector representing the relative position of the two antenna locations;
   measuring a relative carrier phase between the first and second antenna locations based upon the received signals at the first receiver and the second receiver;
   calculating an anomaly detection metric as a function of a difference between the measured relative carrier phase and the predicted relative carrier phase; and
   determining if an anomaly is present according to the anomaly detection metric.

* * * * *